United States Patent [19]
Corey

[11] 4,199,791
[45] Apr. 22, 1980

[54] AUTOMATIC RECORDING SYSTEM

[75] Inventor: Lawrence G. Corey, Rockville, Conn.

[73] Assignee: UMC Electronics Co., North Haven, Conn.

[21] Appl. No.: 897,276

[22] Filed: Apr. 17, 1978

[51] Int. Cl.² ........................................... G11B 15/18
[52] U.S. Cl. ........................................................ 360/69
[58] Field of Search ................... 360/13, 15, 59, 69, 360/63, 27; 179/100.1 DR, 100.1 R, 6 E, 6 C, 2 DP, 15 AL, 15 BA; 340/185; 358/86, 257, 296

[56] References Cited
U.S. PATENT DOCUMENTS

| | | | |
|---|---|---|---|
| 3,789,137 | 1/1974 | Newell | 360/19 |
| 3,797,037 | 3/1974 | Kolpek | 360/13 |
| 4,011,412 | 3/1977 | Mattern | 179/15 AL |
| 4,040,088 | 8/1977 | Hannan | 360/19 |
| 4,058,830 | 11/1977 | Guinet | 358/86 |
| 4,075,436 | 2/1978 | Bolick | 360/69 |
| 4,113,994 | 9/1978 | Bolick et al. | 179/6 E |
| 4,119,795 | 10/1978 | Höelzl | 179/15 BA |
| 4,119,804 | 11/1978 | Hafner | 179/15 AL |

*Primary Examiner*—John H. Wolfe
*Attorney, Agent, or Firm*—DeLio and Montgomery

[57] ABSTRACT

Apparatus for receiving a transmission including message signals each preceded by a recording device selection component and recording each message signal on a recording device identified by the selection component. The apparatus includes a plurality of recording devices, means for identifying the recording device selected by the selection component and for actuating the recording device to record the next succeeding message signal.

6 Claims, 3 Drawing Figures

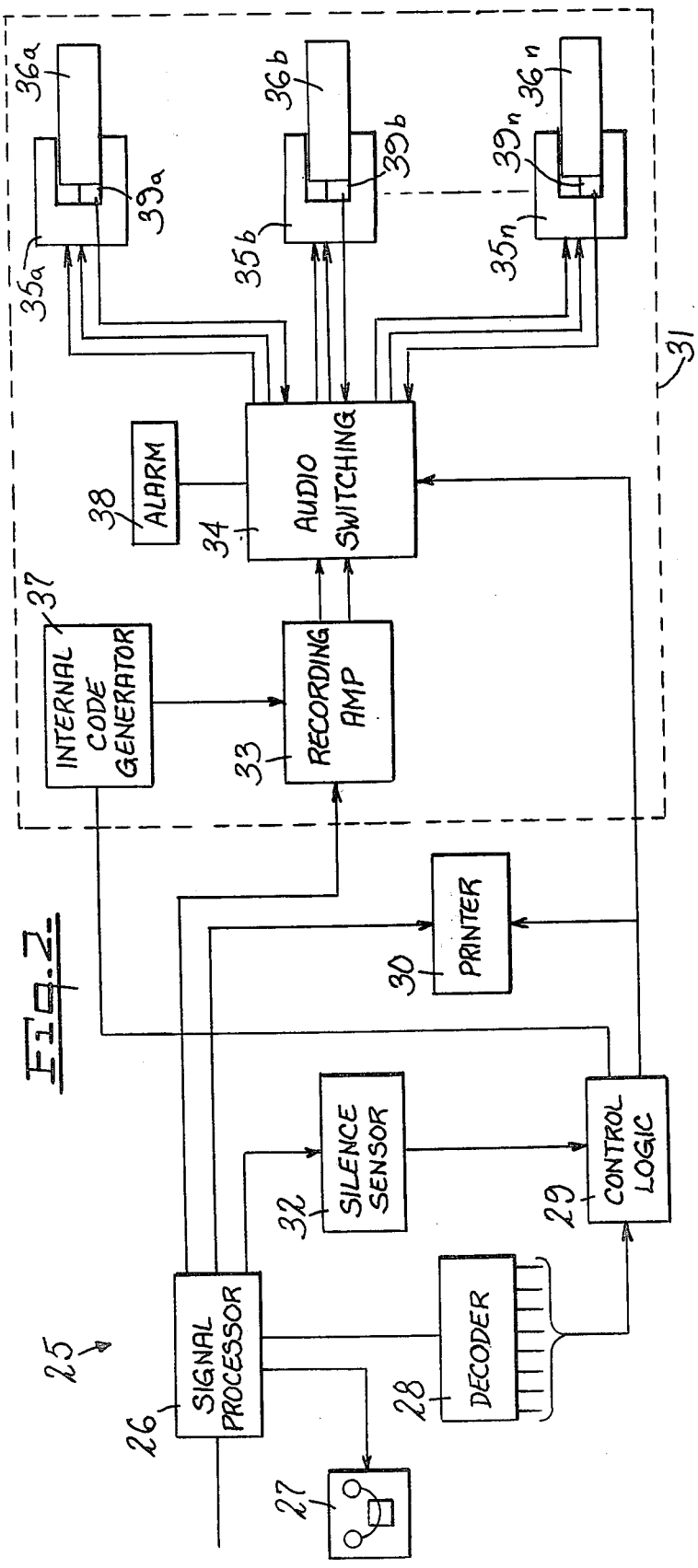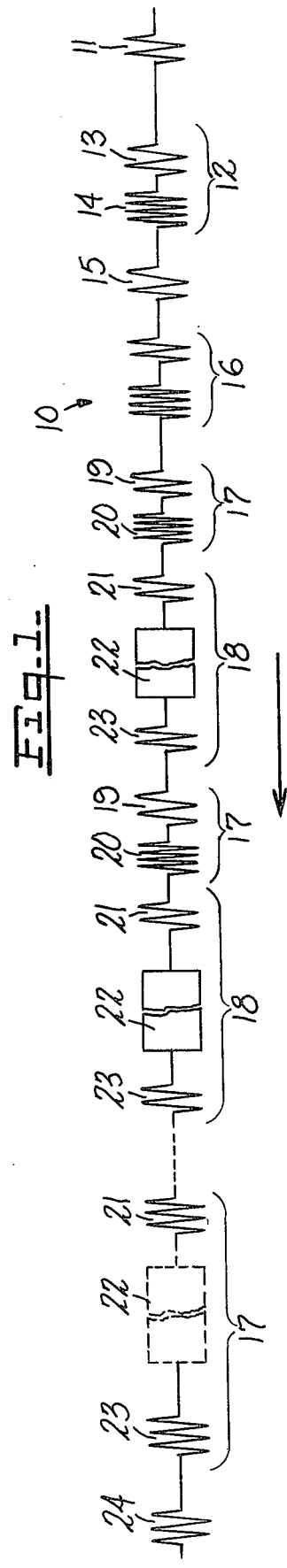

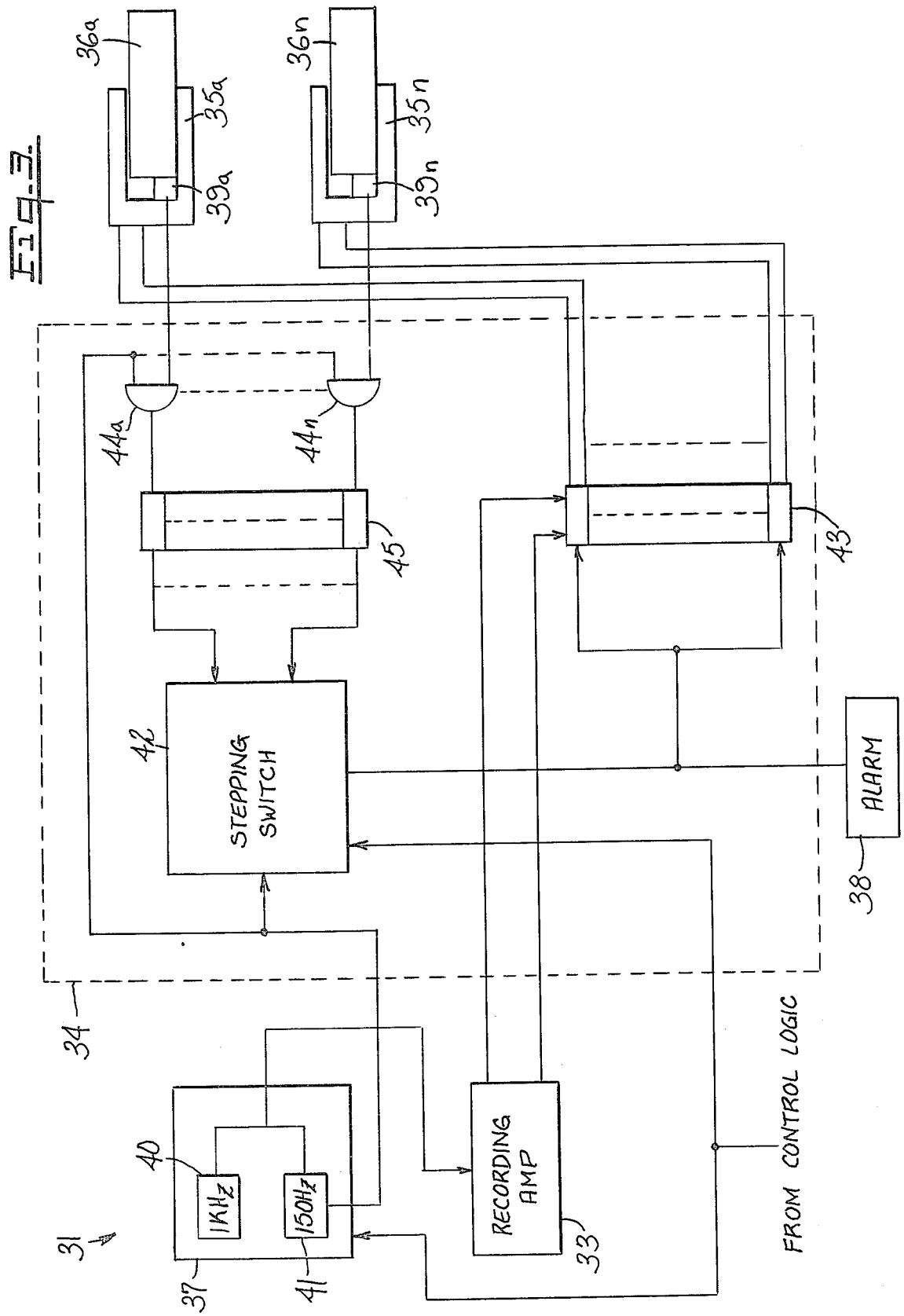

AUTOMATIC RECORDING SYSTEM

BACKGROUND OF THE INVENTION

1. Field of the Invention

The invention relates to automatic recording apparatus and more specifically to apparatus for use in broadcasting stations.

2. Description of the Prior Art

Broadcasting stations subscribe to wire services such as the Associated Press, United Press International or the major networks to provide them with reports and commentaries on news and current events. Such reports generally are transmitted over exisiting telephone lines to the subscribing stations, where they are recorded for use on news broadcasts.

An incoming transmission from the wire service generally consists of coded control signals, voice instrucions, signals comprising a written commentary or introduction to be typed on a printer or teletype, and audio messages to be broadcast by the station. Currently, when a transmission is received at a broadcasting station, it is recorded on a tape recorder and played back by station personnel who re-record the individual messages onto individual audio cartridges. Station personnel also prepare the written commentary and often prepare labels for the cartridges identifying the cartridges for the broadcast personnel in accordance with the wire service instructions. The present practice is wasteful in terms of manpower expended and is subject to human error.

The present invention provides apparatus for automatically recording wire service messages on individual cartridges and recording or printing the incoming printed commentary or labels as may be received from the wire service, eliminating the necessity of having the station personnel on hand to perform the tasks.

SUMMARY OF THE INVENTION

Briefly described, the invention provides apparatus capable of using the wire services' present control signals to direct the incoming transmission to a particular recording device, such as a printer or one of a plurality of tape cartridge recording devices. A decoder decodes the control signal identifying the recording device to be used for the next messages whether printer or tape cartridge. A control logic unit receives the information from the decoder and selects the particular recording device to be actuated. Means are provided to detect the end of the particular message and the end of a transmission.

It is an object of the invention to provide apparatus for receiving transmissions including a plurality of messages and control signals, and directing the messages to particular recording devices as directed by the control signals.

It is another object of the invention to provide apparatus for receiving transmissions comprising a plurality of messages from wire services or the like, the messages to be recorded on individual recording devices.

BRIEF DESCRIPTION OF THE DRAWINGS

The features of the invention which are believed to be novel are particularly pointed out and distinctly claimed in the concluding portion of this speification. The invention, however, both as to its organization and operation, together with further objects and advantages thereof may best be appreciated by reference to the following detailed description taken in conjunction with the drawings, wherein:

FIG. 1 is a representation of a transmission to a broadcast station from a wire service or the like;

FIG. 2 is a block diagram of apparatus according to the invention; and

FIG. 3 is a block diagram showing a portion of FIG. 2 is more detail.

DESCRIPTION OF THE PREFERRED EMBODIMENT

As exemplified in FIG. 1, a typical transmission 10 from a wire service, network or the like, may comprise a plurality of serially transmitted signals, such as a signal 11 indicating the beginning of the transmission which may also be used to actuate the recording apparatus from a standby mode. Transmission 10 may next include a message segment 12 indicating the number of messages contained in the transmission. The message segment 12 includes a first component 13 for selecting a particular recording device, in this instance preferably a teletype or other printer. Signal 12 further includes a message signal 14 setting forth the number of message segments to follow in the transmission.

Transmission 10 may further include one or more error signals exemplified as signal 15 indicating the next preceding transmission was in error and that the next transmission 16 would be a correction.

Transmission 10 typically may contain printed message segments 17 and audio message segments 18. Printed message signal 17 includes a recording device selection component 19 and message signal 20. Component 19 serves to identify segment 17 as being directed to a printer such as a teletype, and message signal 20 includes signals for actuating the printer to print the message.

Audio message segments 18 include a recording device selection component 21, an audio message signal 22 and an end of message signal 23. Component 21 identifies segment 18 as containing an audio signal and indicates that the message signal 22 should be recorded on an audio tape cartridge. Component 21 and signal 22, and signal 22 and signal 23 are separated by silence periods of predetermined duration.

Printed message segments 17 and audio message segments 18 may be alternated, the written commentary referring to the next succeeding audio message.

The transmission 10 may be concluded by an end of transmission signal 24 which returns the recording apparatus to a standby status to await the next transmission.

As exemplified in FIG. 2, the invention provides apparatus 25 for receiving transmission 10 and directing the various message signals to particular recording devices as directed by the transmission. Apparatus 25 includes a signal processor 26 for filtering out noise and for matching the impedance of the incoming telephone line to the other components of apparatus 25. Apparatus 25 also includes a transmission storage device such as a reel-to-reel recorder 27 which records the entire transmission in the event apparatus 25 or components thereof are faulty and a transmission or particular message is not recorded properly.

A decoder 28 is connected to signal processer 26, which receives the filtered transmission from the signal processor and responds to the recording device selection portion of the individual message segments. The decoder decodes the device selection portion of the message and selects which recording device is to be actuated to record the accompanying message. Currently, wire services transmit mixtures of at least two selected tones, commonly referred to as touch tones, as commands or information regarding the accompanying message signals, including identifying the appropriate recording device to record the message signal. The tones comprising touch tones are selected from a set of selected tones, particular combinations of which identify the appropriate command. Decoder 28 senses the coincidence of the frequencies in the touch-tone combination to identify the command.

A control logic unit 29 is connected to decoder 28 to actuate the recording device selected in response to the decoder's device selection. The control logic unit 29 actuates the particular recording device, such as printer 30 or audio recording portion of the system 31. Printer 30 may comprise, for example, a teletype responsive to frequency shift keying signals fed to it through signal processer 26.

Apparatus 25 further includes a silence sensor 32 which receives the transmission from signal processor 26 and senses the intervals of silence during the transmission. When the silence interval exceeds a preselected maximum duration, for example two seconds, it signals the control logic unit 29, indicating that the preceding message has ended. The control logic unit 29 is then made ready to receive another device selection command from the decoder or to place the apparatus 25 in standby if the end of transmission signal is received.

Audio recording system 31 includes a recording amplifier 33 for amplifying the transmission received from the signal processer 26. An example of an appropriate amplifier is reproducing amplifier type SL2020 of UMC Electronics Co., North Haven, Conn. Device 31 further includes an audio switching unit 34 for directing the audio message to one of a plurality of cartridge recorders 35a-35n each including a removable cartridge 36a-36n.

Starting at the beginning of the transmission with the first cartridge recorder 35a, audio switching unit 34 sequentially actuates the next available cartridge recorder 35a-35n each time control logic unit 29 actuates audio recording system 31. System 31 also includes an internal code generator 37 and an alarm 38.

The cartridges 36a through 36n are audio tape cartridges standard in the broadcasting industry. Typically, a control track and one or more audio tracks are recorded on such a cartridge. The control track includes a beginning of recording signal and an end of recording signal at the beginning and end, respectively, of the message recorded on the audio tracks. The beginning of recording and end of recording signals are generated by internal code generator 37 actuated by control logic unit 29 in response to beginning of message signal 22 and end of message signal 23, respectively, of transmission 10. The code signals generated by internal code generator 37 are supplied to the cartridge recorders 35a through 35n through recording amplifier 33, the particular recorder 35 being chosen by audio switching unit 34.

Cartridge recorders 35a-35n are standard tape cartridge recorders including tape heads, circuitry and tape drives sufficient to record onto the tape such as a type SL2019 recording system of UMC Electronics Co., North Haven, Conn. A recording amplifier is not needed with each recorder as recording amplifier 33 suffices for all of the recorders.

Each cartridge recorder 35a-35n also includes a cartridge sensing probe 39a-39n for sensing when a cartridge is engaged therein. A typical cartridge probe may comprise, for example, a pressure switch having a sensor which comes into contact with a properly engaged cartridge. If an actuated recorder 35a-35n has no cartridge engaged, or if the cartridge is improperly engaged, its probe 39 causes switching unit 34 to actuate the next recorder to record the message.

Cartridge recording system 31 further includes an alarm 38 actuated when there is no cartridge in a selected recording unit or when the cartridges in all of the recorders have been recorded.

With reference to FIG. 3, an example of a recording system 31 suitable for use in apparatus 25 includes an internal code generator 37 having a one kilohertz signal generator 40 to generate the beginning of recording signal and a 150 hertz signal generator 41 to generate the end of recording signal. Audio switching unit 34 may include, for example, a stepping switch 42 for sequentially actuating cartridge recorders 35a through 35n. Stepping switch 42 is connected to a stepping register 43 to sequentially actuate recorders 35 and direct the recording signal and audio signal from recording amplifier 33 to the actuated cartridge recorder in response to the stepping switch being actuated by control logic unit 29.

Recording system 31 further includes apparatus for sensing the ready condition of the cartridge recorders 35a through 35n, including coincidence gates 44a through 44n connected to sense the coincidence of signal from 150 hertz generator 41 and the cartridge sensing probes 39a through 39n. Coincidence gates 44a through 44n are connected to a register 45 so that when a coincidence gate is triggered, indicating that the cartridge 36 has been recorded, a signal is stored by register 45 indicating that the cartridge is not available for recording. Register 45 is connected to stepping switch 42. When stepping switch 42 is actuated by control unit 29, it determines from register 45 the last recorder to have been recorded. Stepping switch 42 selects the next recorder and through register 43 directs the audio and the control signals from recording amplifier 33 to the selected recorder. If the selected cartridge recorder is not ready to record because there is no cartridge properly engaged therein, the corresponding coincidence gate is triggered by probe 39 to store that condition in register 45. Stepping switch 42 senses the condition stored in register 45 and actuates the next recorder ready to record as indicated in register 45. After the last recorder ready to record has been recorded, stepping switch 42 actuates alarm 38.

In operation, an incoming transmission is received by signal processor 26 and recorded on recorder 27. The transmission is simultaneously fed to decoder 28, which decodes the recording device selection component at the beginning of each message segment. The decoder is actuated when the touch tones are identified and decoded by the decoder, that is, when the decoder senses two discrete frequencies from the preselected set of frequencies. The decoded information is transmitted to control logic unit 29, which actuates the particular recording device identified as appropriate to record the message, for example, a printer 30 or an audio recording system 31. If a message segment is a written message segment, printer 30 may be actuated to print the message in response to the signals received from signal processer 26.

When the message segment received is an audio message segment to be recorded on a tape cartridge 36, control logic unit 29 actuates internal code generator 37 and audio switching unit 34. The audio switching unit 34 actuates the next available cartridge recorder 35a through 35n to receive and record the audio message from recording amplifier 33. The internal code generator 37 generates a beginning of recording code which is fed through recording amplifier 33 and audio switching unit 34 and is placed on the control track of the actuated tape by its recording device. The message signal from signal processor 26 is then recorded on the audio track of the actuated tape cartridge. When the silence sensor 32 senses a silence in the transmission longer than the selected time, control logic unit 29 determines that the preceding message is ended. Unit 32 then actuates internal code generator 37 a second time and an end of recording signal is placed on tape 36. After the message has been recorded on the cartridge, the cartridge recorder's internal tape drive continues to drive the recorded tape with the recording heads off, until the beginning of recording signal on the tape is sensed, at which time that tape drive stops and the cartridge can be removed. The cartridge can now be cued up to a playback device at the broadcasting station.

If a message is determined to have been erroneously recorded, the transmission storage device 27 recording can be played through apparatus 25 and the erroneously recorded message can be properly recorded.

The silence sensor 32 is normally triggered on sensing silences in the transmission for at least two seconds. The two-second interval is chosen because that is normally substantially longer than is a normal silence period in teletype or in audio transmissions. The period of silence at the end between audio message 22 and end of message signal 23 is chosen to at least exceed the time period selected for the silence sensor.

Providing the decoder 28 as being responsive to touch tones is by way of example and not limitation. The touch-tone decoder is disclosed herein as wire services use touch-tone codes in their transmissions. A decoder 28 responsive to other codes, such as digital signals, is within the scope of the invention.

It may thus be seen that the objects of the invention set forth as well as those made apparent from the foregoing description are efficiently attained. While a preferred embodiment of the invention has been set forth for purposes of disclosure, modification to the disclosed embodiment of the invention as well as other embodiments thereof may occur to those skilled in the art. Accordingly, the appended claims are intended to cover all embodiments of the invention and modifications to the disclosed embodiment which do not depart from the spirit and scope of the invention.

I claim:

1. Apparatus adapted to receive and record a transmission containing a plurality of serial message segments including audio segments and audio identification signals comprising, a plurality of audio recording devices, means for sensing the availability of the recording devices to record a message, means for identifying an audio segment of the transmission, actuating means responsive to said availability sensing means and said means for identifying for selecting and actuating an available recording device to record the identified audio segment, said actuating means selecting and actuating a succeeding available recording device to record each audio message segment, and means for sensing the end of an audio message.

2. The apparatus of claim 1 where the end of an audio message is sensed by sensing a predetermined time of silence following an audio segment of the transmission.

3. The apparatus of claim 1 further including means responsive to said means for identifying for generating a beginning of audio recording signal, and means responsive to said means for sensing the end of an audio message for generating an end of audio recording signal, said actuating means applying said beginning and end of audio recording signal to the selected recording device.

4. The apparatus of claim 3 where the end of an audio message is sensed by sensing a predetermined time of silence following an audio segment of the transmission.

5. The apparatus of claim 1 including other types of recording devices for message segments which may be in the transmission and the transmission contains a recording device type identification signal and further including decoding means for identifying the type of recording device, and applying the message segment to the identified recording device type.

6. Apparatus as defined in claim 1 further including alarm means actuated when all of the available audio recording devices have been recorded.

* * * * *